(12) United States Patent
Black

(10) Patent No.: US 8,300,543 B2
(45) Date of Patent: Oct. 30, 2012

(54) METHOD AND SYSTEM FOR ESTABLISHING A COMMUNICATIONS CONNECTION

(75) Inventor: Robert B. Black, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 244 days.

(21) Appl. No.: 12/396,093

(22) Filed: Mar. 2, 2009

(65) Prior Publication Data

US 2009/0161574 A1    Jun. 25, 2009

Related U.S. Application Data

(63) Continuation of application No. 10/807,786, filed on Mar. 23, 2004, now Pat. No. 7,499,408.

(51) Int. Cl.
*H04L 12/26* (2006.01)
(52) U.S. Cl. .......................... 370/252; 370/248; 370/465
(58) Field of Classification Search .................. 370/248, 370/252, 465
See application file for complete search history.

(56) References Cited

U.S. PATENT DOCUMENTS

| | | | |
|---|---|---|---|
| 6,154,524 A * | 11/2000 | Bremer | 379/10.03 |
| 6,266,348 B1 * | 7/2001 | Gross et al. | 370/493 |
| 6,751,315 B1 | 6/2004 | Liu et al. | |
| 6,775,268 B1 | 8/2004 | Wang et al. | |
| 6,778,505 B1 | 8/2004 | Bullman et al. | |
| 6,829,294 B2 | 12/2004 | Sweitzer et al. | |
| 6,870,899 B2 | 3/2005 | Lu et al. | |
| 6,873,623 B2 | 3/2005 | Weirich | |
| 6,967,996 B1 | 11/2005 | Cai et al. | |
| 6,975,597 B1 | 12/2005 | Baker | |
| 6,978,011 B1 | 12/2005 | Bailey | |
| 7,006,452 B2 | 2/2006 | Lund | |
| 7,012,899 B1 | 3/2006 | Hagler et al. | |
| 7,035,249 B2 | 4/2006 | Christensen et al. | |
| 7,093,289 B2 | 8/2006 | McElroy et al. | |
| 7,142,590 B2 | 11/2006 | Kelliher | |
| 7,142,591 B2 | 11/2006 | Kelliher | |
| 7,242,761 B1 | 7/2007 | Milbrandt | |
| 7,266,109 B1 | 9/2007 | Rosenstein et al. | |
| 2002/0176365 A1 * | 11/2002 | Lund | 370/244 |
| 2003/0218984 A1 * | 11/2003 | Tanaka | 370/248 |
| 2004/0240464 A1 * | 12/2004 | Fite | 370/438 |
| 2004/0252703 A1 * | 12/2004 | Bullman et al. | 370/395.52 |

* cited by examiner

Primary Examiner — Jason Mattis
(74) Attorney, Agent, or Firm — Baker Botts L.L.P.

(57) ABSTRACT

According to one embodiment of the invention, a method for establishing a communications connection is provided. The method includes transmitting, by a digital subscriber line access multiplexer to a communications device, a plurality of parameters each representing a different indication of a same feature of the digital subscriber line access multiplexer. Each parameter is correlated with one or more communications settings. The method also includes establishing a plurality of digital subscriber line connections with the communications device. Each connection corresponds with a particular one of the parameters. The method also includes selecting one of the connections as meeting a predetermined criteria. The method also includes identifying one of the parameters that corresponds to the selected connection. The method also includes establishing a digital subscriber line connection with the communications device using at least one communications setting correlated with the identified parameter.

15 Claims, 3 Drawing Sheets

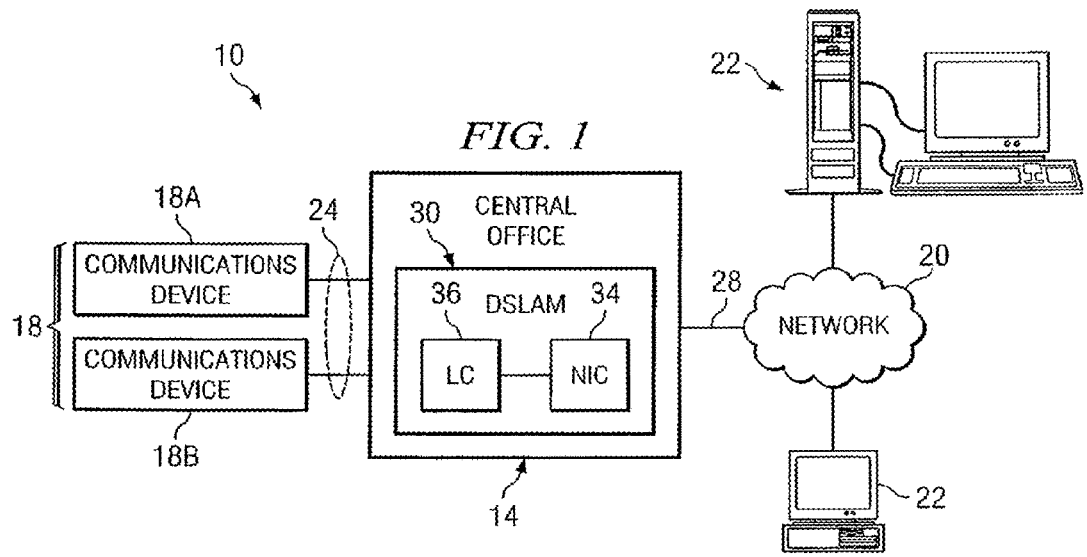
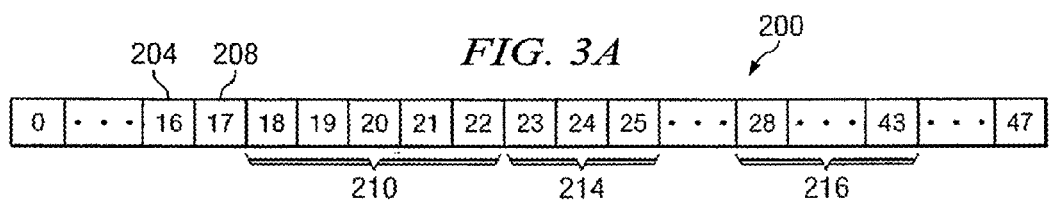

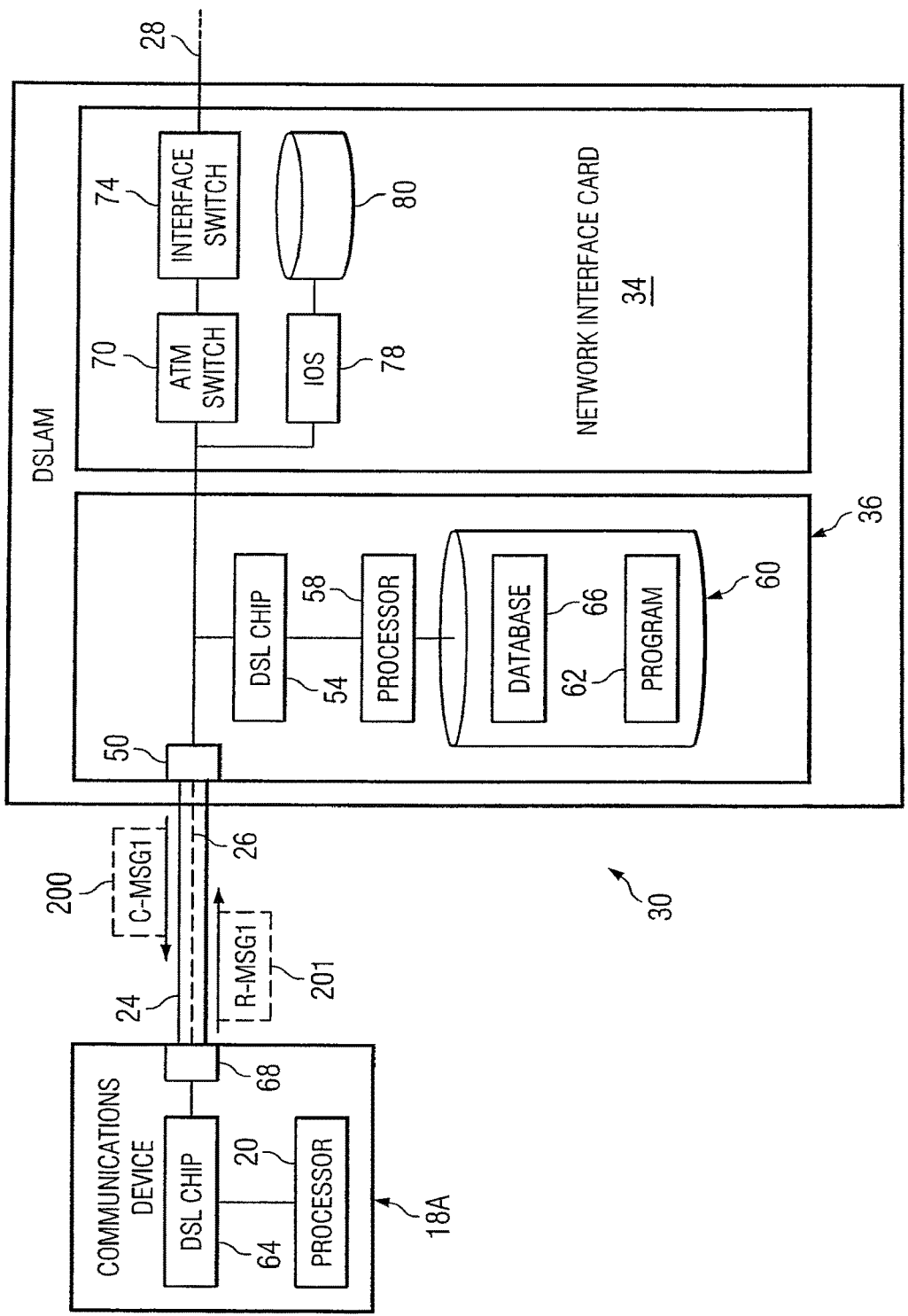

METHOD AND SYSTEM FOR ESTABLISHING A COMMUNICATIONS CONNECTION

CROSS-REFERENCE TO RELATED APPLICATION

This application is a continuation of U.S. application Ser. No. 10/807,786 filed Mar. 23, 2004 and entitled "Method and System for Establishing a Communications Connection".

TECHNICAL FIELD OF THE INVENTION

This invention relates generally to communications and more particularly to a method and system for establishing a communications connection.

BACKGROUND OF THE INVENTION

Digital subscriber line ("DSL") technology is often employed in today's society to access the internet or other networks. In response to a growing popularity of DSL, many different communications equipment manufacturers are entering the DSL equipment market. As the number of such manufacturers increases, the diversity of DSL equipment also increases. Thus, interoperability between the numerous types of DSL equipment may become a challenge.

Working through the interoperability challenge is an expensive and time consuming process for a manufacturer of a digital subscriber line access multiplexer ("DSLAM"), which functions as a bridge between customer-side DSL equipment and the network. For every new type of customer-side DSL equipment that enters the market, the DSLAM manufacturer may need to update each DSLAM with a new set of communications settings in order to provide an optimal connection with the new customer-side DSL equipment. The problem of interoperability may become more complicated when some customer-side DSL equipment manufacturers attempt to cut their production costs by sacrificing interoperability. For example, if a DSL device is manufactured by manufacturer "A" who decides to cut production costs by skipping the process of determining the communications settings applicable to its DSL devices, manufacturer "A" may design its DSL devices to either identify themselves during the train-up process with a DSLAM as having been manufactured by manufacturer "B" that manufactures DSL products with communications settings known to DSLAMs. Manufacturer "A" may also design its devices so that during the train-up process, the devices merely repeat back the manufacturer identification provided by the DSLAM. These cost-saving tactics may result in connections having poor quality or failed connections, which may be detrimental to consumers.

SUMMARY OF THE INVENTION

According to one embodiment of the invention, a method for establishing a communications connection is provided. The method includes transmitting, by a digital subscriber line access multiplexer to a communications device, a plurality of parameters each representing a different indication of a same feature of the digital subscriber line access multiplexer. Each parameter is correlated with one or more communications settings. The method also includes establishing a plurality of digital subscriber line connections with the communications device. Each connection corresponds with a particular one of the parameters. The method also includes selecting one of the connections as meeting a predetermined criteria. The method also includes identifying one of the parameters that corresponds to the selected connection. The method also includes establishing a digital subscriber line connection with the communications device using at least one communications setting correlated with the identified parameter.

Some embodiments of the invention provide numerous technical advantages. Other embodiments may utilize some, none, or all of these advantages. For example, according to one embodiment, interoperability is enhanced between communications devices by cycling through different parameters to determine that a parameter or set of parameters results in an optimal communications connection. According to another embodiment, the production cost of a digital subscriber line access multiplexer is reduced. According to another embodiment, the quality of communications connections is improved.

Other advantages may be readily ascertainable by those skilled in the art.

BRIEF DESCRIPTION OF THE DRAWINGS

Reference is now made to the following description taken in conjunction with the accompanying drawings, wherein like reference numbers represent like parts, in which:

FIG. 1 is a schematic diagram illustrating one embodiment of a digital subscriber line communications system;

FIG. 2 is a schematic diagram illustrating one embodiment of a digital subscriber line access multiplexer shown in FIG. 1;

FIG. 3A is a schematic diagram illustrating one embodiment of a C-MSGS1 message shown in FIG. 2;

FIG. 3B is a schematic diagram illustrating one embodiment of a database shown in FIG. 2.

DETAILED DESCRIPTION OF EXAMPLE EMBODIMENTS OF THE INVENTION

Figure 4:
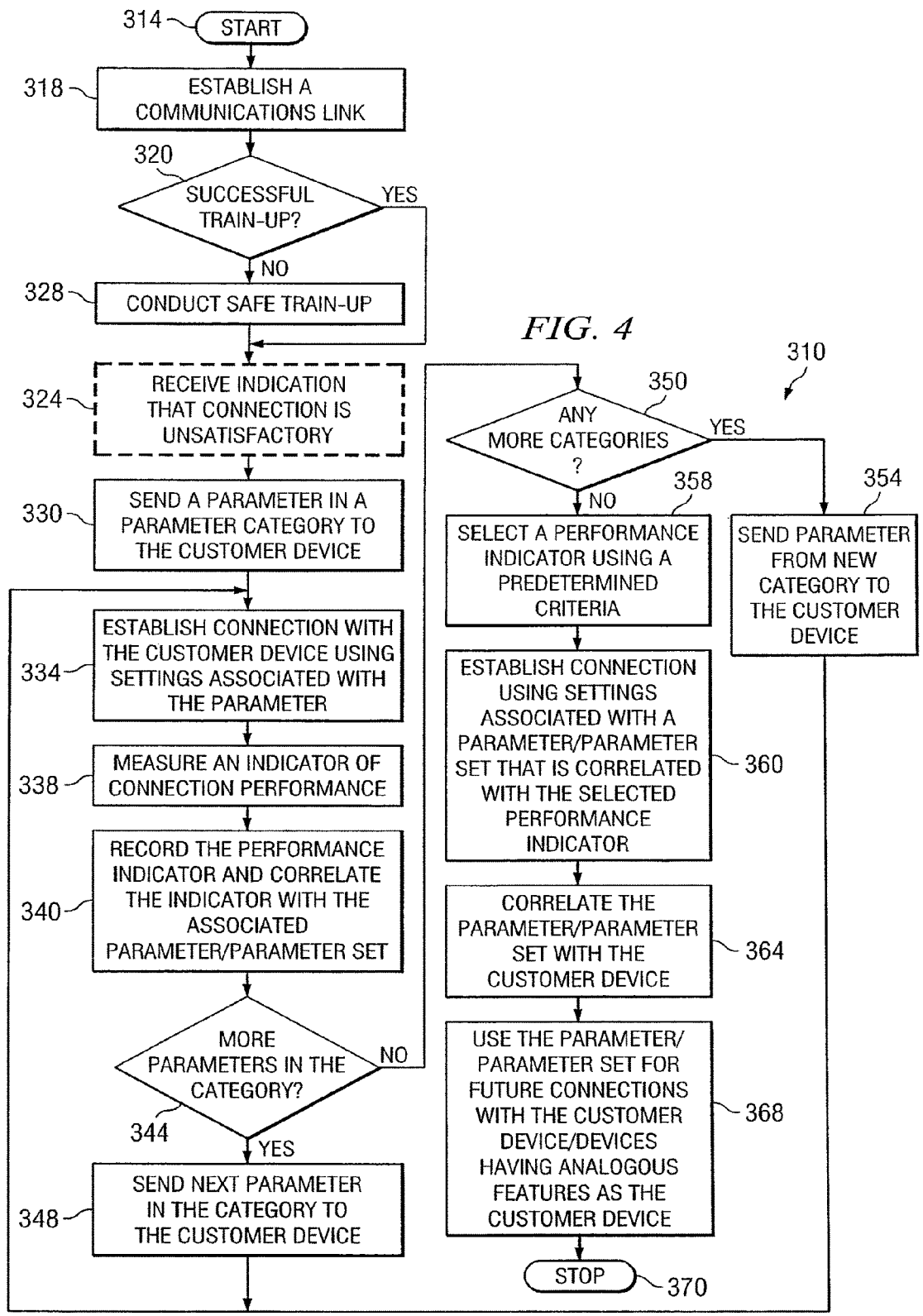
FIG. 4 is a block diagram illustrating one embodiment of a method for establishing a communications connection.

Embodiments of the invention are best understood by referring to FIGS. 1 through 4 of the drawings, like numerals being used for like and corresponding parts of the various drawings.

FIG. 1 is a schematic diagram of a communication system 10 that may benefit from the teachings of the present invention. System 10 includes a central office 14, one or more communication devices 18A and 18B (jointly referred to as communications devices 18), a network 20, such as an internet protocol network, and a plurality of communications devices 22. Devices 18 are coupled to central office 14 by physical lines 24, such as telephone lines. Central office 14 is coupled to network 20 by a trunk line 28. Trunk line 28 may be any suitable communications link that may carry internet protocol traffic, including OC3, DS3, and T1 (STM1, E3, E1, in Europe). Network 20 is coupled to communication devices 22, such as a server 22 having web site content. Network 20 and central office 14 allow communication between devices 18 and 22.

Central office 14 comprises, among other components not explicitly shown, a digital subscriber line access multiplexer ("DSLAM") 30. DSLAM 30 allows communication between communications devices 18 and devices 22 coupled to network 20 using digital line subscriber ("DSL") technology, which may offer a faster connection speed than a traditional dial-up connection. DSLAM 30 comprises, in this example, a network interface card 34 and a line card 36. Although FIG. 1 shows one line card 36, more line cards may be utilized to accommodate more communication devices 18. Although FIG. 1 shows one communications device 18 coupled to central office 14 over one line 24, multiple communications devices 18 may be coupled to central office 14 over one or more physical lines 24. As shown in FIG. 1, line card 36 is coupled to network interface card 34. Communications device 18 may be any device, such as a computer, that is operable to establish a communications connection with central office 14. In one embodiment, device 18 is operable to establish a DSL connection with DSLAM 30.

In operation, network interface card 34 communicates with devices 22 coupled to network 20 over trunk line 28. Network interface card 34 receives data from network 20 over trunk line 28 and communicates the received data to an appropriate line card 36 that is associated with the intended destination of the data. An example of such a destination is device 18A. Conversely, network interface card 34 receives data from line card 36 and communicates the received data over trunk line 28 to network 20. Network interface card 34 also contains ethernet switch fabric or ATM switch fabric (shown and described in conjunction with FIG. 2) that manages and processes incoming data. Network interface card 34 manages all aspects of DSLAM 30, including system help, system performance, switch help and performance, and network communications.

Line card 36 receives data from communications devices 18 over telephone line 24 and communicates the received data to network interface card 34 for eventual transmission to device 22 through network 20. Conversely, line card 36 receives data through network 20 and network interface card 34 from device 22 and communicates the received data to an appropriate communications device 18 over line 24. Each line 24 provides a physical medium in which DSLAM 30 and one or more communications devices 18 may form respective DSL connections for communicating data.

For DSLAM 30 and communications devices 18 to communicate using DSL technology, DSLAM 30 and communication devices 18 may be required to be manufactured according to a particular industry standard, such as the one adopted by American National Standards Institute ("ANSI"). For example, DSL-capable devices are manufactured pursuant to a version of a standard referred to as ANSI T1.413. However, although this standard is available, manufacturers may manufacture DSL devices 18 that have certain unique characteristics that are not addressed by the standard or contrary to the guidelines of the standard. Further, manufacturers may use different versions of ANSI T1.413 to manufacture their devices 18, which may increase the variance between available DSL communications devices 18. To enhance interoperability between a variety of communications devices 18 and DSLAM 30, manufacturers of communications devices 18 may provide a manufacturer of DSLAM 30 with communications settings that may be used in conjunction with their particular type of communications device 18 to establish an optimal DSL connection. In turn, a DSLAM manufacturer may program DSLAM 30 so that the particular set of settings provided by manufacturers of devices 18 may be triggered into use based on one or more parameters received from the particular communications device 18. For example, manufacturer "A" of communications device 18A may provide settings "x" and "y" to be available in DSLAM 30. "x" may be bit swapping, and "y" may be trellis encoding. However, other settings may also be provided.

Upon receiving a parameter indicating that communications device 18A is manufactured by manufacturer "A", DSLAM 30 is operable to adjust its communications settings to "x, y, and z" so that an optimal connection may be established between communications device 18A and DSLAM 30. However, because new manufacturers of DSL equipment continually enter the equipment market, it is costly and time consuming for a DSLAM manufacturer to continually update the available communications settings in DSLAM 30.

Further, some manufacturers of communications devices 18 may attempt to cut the production costs by sacrificing interoperability with DSLAM 30. For example, manufacturer "A" of communications device 18A may decide to cut production costs by skipping the process of determining the communication settings applicable to its device 18A. Instead, manufacturer "A" may design its device 18A to identify itself during the train-up process with DSLAM 30 as being made by another manufacturer that has products with communication settings known to DSLAM 30. It is also possible for the device 18A to merely mirror the manufacturer identification provided by DSLAM 30. For example, if manufacturer "A" knows that manufacturer "B" has provided settings to DSLAM manufacturer of DSLAM 30, then manufacturer "A" may design communications device 18A to identify itself as a device manufactured by manufacturer "B". In another example, if DSLAM 30 indicates that the manufacturer of DSLAM 30 is "C" during the train-up process, then communications device 18A may identify itself also as having been manufactured by manufacturer "C," thus mirroring the input from DSLAM 30. While these tactics may work from time to time to establish acceptable DSL connections, the probability of poor quality or failed DSL connections increases because DSLAM 30 does not have pre-determined settings to establish an optimal DSL connection.

According to one embodiment of the present invention, a method and system are provided for improving interoperability of communications equipment by enabling DSLAM 30 to cycle through a variety of parameters and select a parameter or a parameter set that results in an optimal connection with communications device 18. In one embodiment, the production cost of a DSLAM is reduced. In one embodiment, the quality of communications connections, such as a DSL connection, is improved. Some embodiments of the invention may utilize some, none, or all of these advantages.

FIG. 2 is a schematic diagram illustrating additional details of one embodiment of DSLAM 30 shown in FIG. 1. In one embodiment, DSLAM 30 comprises line card 36 coupled to network interface card 34. Network interface card 34 comprises an ATM switch 70, an interface switch 74, an internetwork operating system ("IOS") 78, and a memory 80. ATM switch 70 is coupled to line card 36, IOS 78, and interface switch 74. IOS 78 is coupled to memory 80. Interface switch 74 is coupled to trunk line 28.

ATM switch 70 of network interface card 34 is operable to receive ATM cells transmitted by communications device 18A through line card 36 and to assemble the ATM cells. ATM switch 70 is also operable to send the assembled ATM cells to interface switch 74. Interface switch 74 is operable to convert the received assembly of ATM cells into a suitable format for transmission to network 20. For example, the assembled set of ATM cells may be converted into ethernet packets for transmission to network 20. Interface switch 74 is also operable to receive data from network 20 and process the data into a format suitable for transmission to ATM switch 70. ATM switch 70 is operable to receive the processed data from interface switch 74 and segment the data into ATM cells for transmission to communications device 18A through line card 36. IOS 78 is operable to store information regarding communications settings that are associated with various parameters that may be exchanged between DSLAM 30 and communications device 18A prior to establishing DSL connection 26. Additional details concerning IOS 78 are described below.

In one embodiment, line card 36 comprises a port 50, a DSL chip 54, a processor 58, and a memory 60 storing a program 62 and a database 66. Processor 58 is coupled to DSL chip 54 and memory 60. DSL chip 54 is coupled to port 50. Port 50 is coupled to line 24 and used to establish a DSL connection 26 with customer device 18A. Communications device 18A comprises a processor 20, a DSL chip 64, and a port 68. DSL chip 64 is coupled to processor 20 and port 68. Port 68 is used to establish DSL connection 26 with DSLAM 30 over line 24.

DSL chip 54 may be one or more integrated circuit chips or chip sets. DSL chip 54 is operable to establish DSL connection 26 with communications device 18A. To that end, DSL chip 54 is operable to conduct train-up with device 18A and channel analysis of DSL connection 26. "Training," or "train-up," refers to a process where DSLAM 30 transmits certain parameters associated with DSL chip 54 and receives certain parameters associated with a DSL chip of another communications device with which chip 54 is attempting to establish a connection, such as DSL chip 64 of device 18A. This exchange of parameters is referred to as a "negotiation" between device 18A and DSLAM 30. Analogous negotiations may be performed between DSLAM 30 and other devices 18. In one embodiment, train-up is initiated when communications device 18A transmits an R-REVERB1 message to DSLAM 30, which contains information that allows DSLAM 30 to measure the upstream wide band power to adjust the transmit power level of DSLAM 30. An R-REVERB1 also allows DSLAM 30 to adjust its receiver gain control and synchronize its receiver and train its equalizer (not explicitly shown in FIG. 2). As a part of the train-up process, DSLAM 30 also transmits a C-REVERB1 message to device 18A pursuant to ANSI T1.413, which allows device 18A to adjust its automatic gain control to an appropriate level.

DSL chip 64 may be one or more integrated circuit chips or chip sets. DSL chip 64 is operable to establish DSL connection 26 with DSLAM 30. To that end, DSL chip 64 is operable to conduct train-up with DSLAM 30. DSL chip 64 is operable to transmits a R-REVERB1 message to DSLAM 30. DSL chip 64 is also operable to receive a C-REVERB1 message from device 18A pursuant to ANSI T1.413, and to adjust device's 18A automatic gain control to an appropriate level.

As a part of the channel analysis process, DSL chips 54 and 64 are operable to exchange their respective parameters so that an optimal DSL connection 26 may be established. Examples of such parameters include a manufacturer (also referred to as "vendor") identification of a DSL chip transmitting the parameter, ANSI T1.413 revision number pursuant to which the transmitting chip was manufactured, vendor revision number identifying the particular model of the transmitting chip, and transmit power level used by the transmitting entity, such as DSLAM 30. Pursuant to ANSI T1.413, DSL chip 54 of DSLAM 30 is operable to transmit a C-MSGS1 200, as shown in FIG. 2, that includes these and other parameters describing chip 54 and DSLAM 30. Conversely, pursuant to ANSI T1.413, DSL chip 64 of device 18A is operable to transmit an R-MSGS1 201 that includes these and other parameters describing chip 64 and device 18A.

Processor 58 is an integrated circuit chip that is operable to execute program 62 stored in memory 60. Processor 58 is also operable to control the operations of DSL chip 54 and access database 62 pursuant to the instructions of program 62.

Program 62 may be executed using processor 58. According to one embodiment of the invention, program 62 is operable to instruct DSL chip 54 to cycle through a series of parameters in one or more parameter categories and assess a connection quality of the resulting DSL connection for each different parameter. From the various parameters used, program 62 is operable to select a parameter or a set of parameters that results in an optimal quality of connection between device 18A and DSLAM 30, and direct chip 54 to use the settings associated with the selected parameter or parameter set to establish connection 26. An optimal connection may include one or more connection characteristics, and additional details describing what constitutes an optimal connection are provided later in this description.

The parameters cycled through by program 62 may or may not indicate the true characteristics of DSL chip 54 and/or DSLAM 30. For example, although DSL chip 54 was made by manufacturer "A," DSL chip 54 may cycle through identities of other manufacturers. In one embodiment, program 62 is operable to cycle through different parameters or parameter sets by directing DSL chip 54 to perform multiple train-up sessions with device 18A. For each train-up session, a C-MSGS1 message 200 transmitted to device 18A includes at least one different parameter than a previous C-MSGS1 message of a previous train-up session. After sending each C-MSGS1 message 200 to device 18A, program 62 may direct DSL chip 54 to use communication settings associated with the particular parameters in the C-MSGS1 message 200 and/or R-MSGS1 message 201 received in response to transmitting C-MSG1 message 200 to establish a connection. For example, where one of the parameters sent to device 18A indicates a manufacturer of DSL chips, communication settings associated with that parameter may include the following: A first setting indicating that a DSLAM having the particular DSL chips may limit the number of bins used in a training session or particular bins where known issues arise. A second setting indicating the use of trellis encoding A third setting indicating the use of overhead framing modes. A fourth setting indicating various applicable power levels. Other settings may be associated with the parameter indicating a manufacturer of DSL chips.

Parameter categories each containing at least one parameter that may be cycled through by program 62 are stored in database 66. Program 62 is also operable to communicate with IOS 78 for storing one or more parameters that are selected as resulting in an optimal DSL connection 26. In response, IOS 78 is operable to store the parameters and/or parameter sets identified by program 62 in memory 80. This is advantageous in some embodiments because any future communications with device 18A or devices 18 similar to device 18A may be established using the correlated parameters stored in memory 80. This may allow program 62 to avoid the process of connection optimization with device 18A. In one embodiment, program 62 may be operable to detect that a customer is using a new communications device 18 that is different from a previously-used device 18. The detection may be made, in one embodiment, through the use of a vendor identification and/or a product identification. In response to such a detection, program 62 may be operable to conduct the connection optimization procedure for the new communications device 18.

In one embodiment, program 62 is operable to conduct a safe train-up procedure if an initial train-up attempt by DSL chip 54 fails. In such a case, program 62 may direct DSL chip 54 to use a limited number of parameters that are necessary to train-up with device 18A. Program 62 may also direct DSL chip 54 to use generic parameters. In turn, the communications settings that are associated with the transmitted parameters are implemented at DSLAM 30. For example, a set of parameters that may be used for safe train-up process may include some or all of the following: A first parameter indicating that bit-swapping is disabled, a second parameter indicating that trellis coding is disabled, a third parameter indicating that full power mode is used (e.g. no power management is conducted), and/or a fourth parameter indicating that overhead framing mode three is supported.

While program 62 is described as a software program in one embodiment, program 62 may be implemented using any suitable methods. For example, a part or all of program 62 may be implemented using DSL chip 54. In a software version, program 62 may be implemented using any suitable computer language, including C+ or C++. An example operation of line card 36 is described below in conjunction with FIG. 4.

FIG. 3A is a schematic diagram illustrating one embodiment of C-MSGS1 message 200 shown in FIG. 2. Message 200 is a 48-bit message, as shown in FIG. 3A. Pursuant to ANSI T1.413 standard, the following bits are used for the following category of parameters. A bit 204 is reserved for echo cancellation. An entry of "0" indicates no echo cancellation is implemented by DSLAM 30, and an entry of "1" indicates that echo cancellation is implemented by DSLAM 30. A bit 208 is reserved for trellis coding option. An entry of "0" indicates that DSLAM 30 has no trellis coding capability, and an entry of "1" indicates DSLAM has trellis coding capability. Trellis coding refers to a method for performing forward error correction, which may decrease communications speed. A bit block 210 is a five-bit block reserved for indicating a particular model of DSL chip 54 that is manufactured by the vendor of DSL chip 54. A bit block 214 is a three-bit block reserved for indicating a particular revision number of ANSI T1.413 standard that was used as a guideline for manufacturing DSL chip 54. A bit block 216 is a 16-bit block reserved for indicating a particular manufacturer of DSL chip 54. All parameters entered in message 200 may in binary form.

FIG. 3B is a schematic diagram illustrating one embodiment of database 66 that may be stored in memory 60. Database 66 includes a plurality of columns 254, 258, and 260 each for a category of parameters, and a plurality of rows 300 each for different parameter options within a particular category of parameters. Columns 254-260 are jointly referred to as columns 270. In one embodiment, as shown in FIG. 3B, column 254 is for a "vendor ID" category, column 258 is for "T1.413 revision number" category, and column 260 is for "vendor revision number" category. Other categories may be indicated using other columns 270. As shown in FIG. 3B, parameters 282-286 in column 254 each indicate a vendor known to DSLAM 30 that may have manufactured DSL chip 64 of device 18A. For example, parameter 282, which is shown as "0000000000000001", may identify Alcatel, Co, who is a DSL chip manufacturer that has provided communications settings that would result in optimal DSL connections for its DLS chips; however, some manufacturers identified in column 254 may not have provided settings to the manufacturer of DSLAM 30. Parameters 282-286 in column 258 each indicate a known version of ANSI T1.413 standard. For example, parameter 288, which shown as "001", identifies T1.413 Issue 2. Parameters 294-298 in column 260 each indicate a particular model identification of a model of product that may be produced by a known vendor. Each vendor identified in column 254 may produce multiple models of DSL chips. Thus, more than one vendor revision parameter may be associated with each vendor in column 254.

Although database 66 uses columns 270 for parameter categories and rows 300 for parameters, any suitable method of arranging data may be used for database 66. For example, rows 300 may be used for parameter categories and columns 270 may be used for parameters. Further, each row 300 may or may not correlate all the parameters in each row 300. For example, parameters 282, 288, and 294 in same row 300 are not necessarily correlated. However, in some embodiments, parameters 282, 288, and 292 may be correlated. Where parameters in at least some of rows 300 are correlated, some columns 270 may include multiple entries of same parameters. For example, if a vendor identified by parameter 282 makes two different types of DSL chips, then parameter 282 may be entered twice for each vendor revision number that would be entered in column 260.

FIG. 4 is a block diagram illustrating one embodiment of a method 310 for establishing a communications connection, such as a DSL connection. Method 310 may be implemented using various devices, including program 62 and/or DSL chip 54 shown in FIG. 2. For illustrative purposes, one embodiment of method 310 is described below using features shown in FIGS. 2-3B; however, any suitable device may be used to implement some or all acts associated with method 310.

Method 310 starts at step 314. At step 318, line cards 36 of DSLAM 30 establishes a communications link with communications device 18A. At step 320, DSL chip 54 determines whether the train-up process with communications device 18A has been successful. If yes, then "yes" branch is followed to step 324. If no, then "no" branch is followed to step 328. At step 328, a safe train-up is conducted by DSL chip 54. In one embodiment, a set of parameters that may be used for the safe train-up procedure may include some or all of the following: A first parameter indicating that bit-swapping is disabled, a second parameter indicating that trellis coding is disabled, a third parameter indicating that full power mode is used (e.g. no power management is conducted), and/or a fourth parameter indicating that overhead framing mode three is supported; however, any other suitable parameter or parameter set that decreases the probability of train-up failure, as determined by one skilled in the art, may be used as a safe train-up parameter/parameter set. In one embodiment, as a part of the safe train-up procedure, parameters indicating an identification of a market-leading vendor and a well-known revision number of a released product may be used. In one embodiment, steps 320 and 328 may be omitted and method 310 may proceed directly from step 318 to step 324.

At step 324, DSLAM 30 may receive an indication that connection 26 is unsatisfactory. For example, this indication may be provided from a user of communications device 18A via a telephone call/email or may be generated automatically from device 18A. In another example, in one embodiment, DSLAM 30 may be used to determine, after a quality analysis of connection 26, that the quality is unsatisfactory using a predetermined criteria. Examples of predetermined criteria include signal-to-noise ratio ("SNR") and data transfer rate. In some embodiments, step 324 may be omitted.

At step 330, program 62 may direct DSL chip 54 to send a parameter in a parameter category to a customer-side device. For example, as shown in FIG. 3B, program 62 may direct DSL chip 54 to send parameter 282 in column 254 to device 18A. In one embodiment, parameter 282 may be sent in bit block 216 of message 200 shown in FIG. 3A. Although one parameter 282 is used as an example, other parameters in other categories may be sent with parameter 282 as a parameter set. In one embodiment, other parameters may be sent in their respective bits or bit blocks of message 200 shown in FIG. 3A. At step 334, DSL chip 54 may establish a connection with device 18A using settings that are associated with parameter 282. For example, communication settings associated with vendor identified by parameter 282 may include the following: A first setting indicating that a DSLAM having the particular DSL chips may limit the number of bins used in a training session or particular bins where known issues arise. A second setting indicating the use of trellis encoding A third setting indicating the use of overhead framing modes. A fourth setting indicating various applicable power levels. Other settings may be associated with the parameter indicating a manufacturer of DSL chips. In some embodiments, more, less, or different types of settings may be associated with parameter 282. In one embodiment, the connection of step 334 may constitute a train-up session, and the parameters for forming the connection of step 334 may be sent using a C-MSGS1 message. For example, C-MSGS1 message may be used to send the parameters of step 330, step 348, or step 354. Steps 348 and 354 are described below.

At step 338, program 62 may measure an indicator of connection performance. Examples of such an indicator include SNR and data transfer rate; however, any other suitable indicators may be used as determined by one skilled in the art.

At step 340, program 62 may record the performance indicator measured at step 338 in memory 60 and correlate the indicator with parameter 282. At step 344, program 62 determines whether more parameters are in column 254 of database 66 shown in FIG. 3B. If yes, then "yes" branch is followed to step 348, where program 62 may direct DSL chip 54 to send next parameter 284 in column 254 to device 18A. In one embodiment, where parameter sets are sent to device 18A, the only difference between the two parameter sets sent respectively in steps 330 and 348 may be that the parameter set sent in step 348 includes parameter 284 instead of parameter 282. Referring again to step 344, if no more parameters are in column 254, then "no" branch is followed to step 350. At step 350, program 62 determines whether there are more categories remaining in database 66. If yes, then "yes" branch is followed to step 354, where program 62 may send a parameter, such as parameter 288, from a new category, such as a category indicated by column 258, to device 18A. In one embodiment, parameter 288 may be sent as a part of a parameter set. Then method 310 proceeds to step 334 where a new connection is established using a different parameter/parameter set. If no, then "no" branch is followed to step 358. In one embodiment, by using steps 334-354, a particular performance indicator may be correlated with every possible combination of available parameters, such as parameters 282 through 298.

At step 358, program 62 may select a recorded performance indicator using a predetermined criteria. An example of a predetermined criteria may be SNR, a data transfer rate, or some combination of these and other criteria. In one embodiment, a performance indicator that indicates the fastest data transfer rate while having the highest signal to noise ratio may be selected at step 358. In one embodiment, the predetermined criteria may include a SNR within a range of 0 db-9 db. In one embodiment, the predetermined criteria may include a SNR within a range of 3 db-6 db. In one embodiment, the predetermined criteria may include a SNR that is greater than 6 db. In one embodiment where a combination of data transfer rate and SNR is used as criteria, a recorded performance indicator that indicates the fast data transfer rate while having a minimum threshold SNR may be selected at step 358. For example, the selected performance may indicate the fast data transfer rate that has a SNR no lower than 6 db.

At step 360, connection 26 is established using the setting associated with one or more parameters that are selected at step 358. At step 364, communications device 18A is correlated with the one or more parameters that were used to establish DSL connection 26 at step 360. The correlation may be recorded at memory 80 through IOS 78. At step 368, the correlation recorded in memory 80 may be used for other connections with communications device 18A, so that it may not be necessary for program 62 to cycle through the available parameters again to determine the best parameter(s) for an optimal connection. In one embodiment, the selected parameter(s) that were used at step 360 may be correlated with a category of devices that device 18A falls under. For example, if device 18A is an ALCATEL SPEEDTOUCH PRO CPE, then all devices identified by the ALCATEL vendor identification may be correlated with the parameters used at step 360. Thus, DSLAM may use the same optimized parameters to establish a connection with any device identified by the ALCATEL vendor identification. Steps 364 and 368 may be omitted in some embodiments. Method 310 stops at step 370.

Although some embodiments of the present invention have been described in detail, it should be understood that various changes, substitutions, and alterations can be made hereto without departing from the spirit and scope of the invention as defined by the appended claims.

What is claimed is:

1. A method comprising:
    establishing, by a digital subscriber line access multiplexer, a communications link with a communications device; and
    repeating, by the digital subscriber line access multiplexer, the following for each parameter set of a plurality of parameter sets:
        selecting a parameter set of the plurality of parameter sets;
        sending the selected parameter set to the communications device;
        establishing a connection to the communications device using one or more settings corresponding to the parameter set;
        measuring a performance indicator indicating connection performance of the connection;
        associating the performance indicator with the parameter set;
        recording the performance indicator associated with the parameter set;
    selecting a recorded performance indicator according to one or more predetermined criteria;
    associating the selected recorded performance indicator with the communications device;
    establishing a next communications link with a next communications device;
    determining that the next communications device has one or more features similar to the communications device; and
    establishing, based on the determination, a next connection with the next communications device using one or more next settings corresponding to a next parameter set associated with the selected-recorded performance indicator.

2. The method of claim 1, the selecting the parameter set further comprising:
    if there are one or more remaining parameters in a current parameter category, selecting a parameter of the one or more remaining parameters; and
    if there are no more remaining parameters in the current parameter category, selecting a parameter of a remaining parameter category.

3. The method of claim 1, the measuring the performance indicator further comprising:
   measuring a signal-to-noise ratio (SNR) or a data transfer rate.

4. The method of claim 1, the sending the selected parameter further comprising:
   sending the selected parameter set in a C-MSGS1 message.

5. The method of claim 1, a parameter set comprising at least one parameter selected from the following:
   a bit-swapping parameter;
   a trellis coding parameter;
   a power mode parameter; and
   an overhead framing mode parameter.

6. A memory storing a software program configured to:
   establish, by a digital subscriber line access multiplexer, a communications link with a communications device; and
   repeat, by the digital subscriber line access multiplexer, the following for each parameter set of a plurality of parameter sets:
      select a parameter set of the plurality of parameter sets;
      send the selected parameter set to the communications device;
      establish a connection to the communications device using one or more settings corresponding to the parameter set;
      measure a performance indicator indicating connection performance of the connection;
      associate the performance indicator with the parameter set; and
      record the performance indicator associated with the parameter set;
   select a recorded performance indicator according to one or more predetermined criteria;
   associate the selected recorded performance indicator with the communications device;
   establish a next communications link with a next communications device;
   determine that the next communications device has one or more features similar to the communications device; and
   establish, based on the determination, a next connection with a next communication device using one or more next settings corresponding to a next parameter set associated with the selected-recorded performance indicator.

7. The memory of claim 6, the software program further configured to select the selected parameter by:
   if there are one or more remaining parameters in a current parameter category, selecting a parameter of the one or more remaining parameters; and
   if there are no more remaining parameters in the current parameter category, selecting a parameter of a remaining parameter category.

8. The memory of claim 6, the software program further configured to measure the performance indicator by:
   measuring a signal-to-noise ratio (SNR) or a data transfer rate.

9. The memory of claim 6, the software program further configured to send the selected parameter by:
   sending the selected parameter set in a C-MSGS1 message.

10. The memory of claim 6, a parameter set comprising at least one parameter selected from the following:
    a bit-swapping parameter;
    a trellis coding parameter;
    a power mode parameter; and
    an overhead framing mode parameter.

11. An apparatus comprising:
    a circuit chip configured to:
       establish, by a digital subscriber line access multiplexer, a communications link with a communications device; and
       repeat, by the digital subscriber line access multiplexer, the following for each parameter set of a plurality of parameter sets:
          select a parameter set of the plurality of parameter sets;
          send the selected parameter set to the communications device;
          establish a connection to the communications device using one or more settings corresponding to the parameter set;
          measure a performance indicator indicating connection performance of the connection;
          associate the performance indicator with the parameter set; and
          record the performance indicator associated with the parameter set;
       select a recorded performance indicator according to one or more predetermined criteria;
       associate the selected recorded performance indicator with the communications device;
       establish a next communications link with a next communications device;
       determine that the next communications device has one or more features similar to the communications device; and
       establish, based on the determination, a next connection with a next communication device using one or more next settings corresponding to a next parameter set associated with the selected recorded performance indicator.

12. The apparatus of claim 11, the circuit chip further configured to select the selected parameter by:
    if there are one or more remaining parameters in a current parameter category, selecting a parameter of the one or more remaining parameters; and
    if there are no more remaining parameters in the current parameter category, selecting a parameter of a remaining parameter category.

13. The apparatus of claim 11, the circuit chip further configured to measure the performance indicator by:
    measuring a signal-to-noise ratio (SNR) or a data transfer rate.

14. The apparatus of claim 11, the circuit chip further configured to send the selected parameter by:
    sending the selected parameter set in a C-MSGS1 message.

15. The apparatus of claim 11, a parameter set comprising at least one parameter selected from the following:
    a bit-swapping parameter;
    a trellis coding parameter;
    a power mode parameter; and
    an overhead framing mode parameter.

* * * * *